US012649412B1

(12) United States Patent
Weston et al.

(10) Patent No.: US 12,649,412 B1
(45) Date of Patent: Jun. 9, 2026

(54) SYSTEMS AND METHODS FOR OPERATING VEHICLE EXTERIOR LIGHTS

(71) Applicant: Ford Global Technologies, LLC, Dearborn, MI (US)

(72) Inventors: Keith Weston, Canton, MI (US); John Robert Van Wiemeersch, Novi, MI (US); Brendan Diamond, Naples, FL (US); Stuart C. Salter, White Lake, MI (US); Michael Alan Mcnees, Flat Rock, MI (US)

( * ) Notice: Subject to any disclaimer, the term of this patent is extended or adjusted under 35 U.S.C. 154(b) by 0 days.

(21) Appl. No.: 19/304,425

(22) Filed: Aug. 19, 2025

(51) Int. Cl.
| | |
|---|---|
| *B60Q 1/24* | (2006.01) |
| *G06F 3/01* | (2006.01) |
| *G06F 3/16* | (2006.01) |
| *H05B 47/11* | (2020.01) |
| *H05B 47/12* | (2020.01) |
| *H05B 47/125* | (2020.01) |
| *H05B 47/13* | (2020.01) |

(52) U.S. Cl.
CPC ............. *B60Q 1/247* (2022.05); *G06F 3/017* (2013.01); *G06F 3/167* (2013.01); *H05B 47/11* (2020.01); *H05B 47/12* (2020.01); *H05B 47/125* (2020.01); *H05B 47/13* (2020.01); *B60Q 2300/112* (2013.01)

(58) Field of Classification Search
CPC ........ B60Q 1/247; H05B 47/11; H05B 47/12; H05B 47/125; H05B 47/13; G06F 3/017; G06F 3/167
See application file for complete search history.

(56) References Cited

U.S. PATENT DOCUMENTS

| | | | |
|---|---|---|---|
| 9,787,949 B2 | 10/2017 | Kim | |
| 9,836,642 B1 | 12/2017 | Ramaswamy | |
| 10,657,360 B2 | 5/2020 | Rozploch et al. | |
| 11,164,010 B2 | 11/2021 | Turk | |
| 11,472,332 B1 | 10/2022 | Salter et al. | |
| 11,589,443 B1 | 2/2023 | Niedert et al. | |
| 11,833,959 B1 | 12/2023 | Mazuir et al. | |
| 12,528,403 B2 * | 1/2026 | Ueda .................... | B60Q 1/2611 |
| 2009/0015388 A1 * | 1/2009 | Yagi ..................... | G02B 26/105 |
| | | | 362/465 |

(Continued)

OTHER PUBLICATIONS

Khairul Anuar Ishak, et al., A Face Detection and Recognition System for Intelligent Vehicles, https://www.researchgate.net/publication/45949530, Mar. 2006, pp. 507-515.

*Primary Examiner* — Christopher E Dunay
(74) *Attorney, Agent, or Firm* — Frank Lollo; Eversheds Sutherland (US) LLP

(57) ABSTRACT

A vehicle including a plurality of lighting units and a processor is disclosed. The plurality of lighting units may be oriented on an exterior of the vehicle to illuminate areas proximate to the vehicle. The processor may identify that a vehicle speed is less than a predefined threshold value. The processor may further identify that a predefined condition is met associated with a vehicle user action or a presence of a specific object in proximity to the vehicle, when the vehicle speed is less than the predefined threshold value. Responsive to identifying that the predefined condition is met, the processor may identify an optimal lighting unit, from the plurality of lighting units, to illuminate the specific object, and automatically activate the optimal lighting unit.

20 Claims, 6 Drawing Sheets

(56)          References Cited

U.S. PATENT DOCUMENTS

| | | | |
|---|---|---|---|
| 2009/0066255 A1* | 3/2009 | Nakayama | B60Q 3/217 |
| | | | 315/77 |
| 2009/0140887 A1 | 6/2009 | Breed et al. | |
| 2012/0056540 A1* | 3/2012 | Schwertberger | B60Q 1/22 |
| | | | 362/459 |
| 2012/0191298 A1* | 7/2012 | Schwarzhaupt | G08G 1/167 |
| | | | 701/36 |
| 2014/0334684 A1 | 11/2014 | Strimling | |
| 2015/0203026 A1* | 7/2015 | Schotanus | B60Q 1/2615 |
| | | | 362/520 |
| 2017/0200197 A1 | 7/2017 | Brubaker | |
| 2017/0305349 A1 | 10/2017 | Naboulsi | |
| 2018/0027634 A1* | 1/2018 | Dalavayi | H05B 47/11 |
| | | | 315/77 |
| 2019/0141467 A1 | 5/2019 | Breed | |
| 2021/0162912 A1 | 6/2021 | Spero | |
| 2023/0204781 A1* | 6/2023 | Thakur | G01S 17/894 |
| | | | 356/5.01 |
| 2023/0278498 A1 | 9/2023 | Foote et al. | |
| 2023/0356728 A1 | 11/2023 | Anshul et al. | |
| 2023/0373383 A1* | 11/2023 | Schmidt | B60Q 1/547 |
| 2024/0361137 A1 | 10/2024 | Aviv et al. | |

* cited by examiner

SYSTEMS AND METHODS FOR OPERATING VEHICLE EXTERIOR LIGHTS

FIELD

The present disclosure relates to vehicles and more specifically to systems and methods for operating vehicle exterior lights.

BACKGROUND

Modern vehicles incorporate a plurality of features that enhances user's experience of operating the vehicles. One such feature is zone lighting feature that provides enhanced visibility around the vehicle, particularly useful in low-light or dark conditions. The zone lighting feature allows users to selectively illuminate specific areas around the vehicle, such as the front, rear, or sides, using dedicated exterior lights.

The zone lighting feature is typically controlled via the vehicle's infotainment system or a mobile app, enabling drivers to turn on lights in specific zones where they are needed. The zone lighting feature is particularly helpful when camping, working outside at night, or navigating dark driveways or remote areas. It enhances user convenience by allowing better visibility and reduces the probability of tripping or encountering obstacles in the dark.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
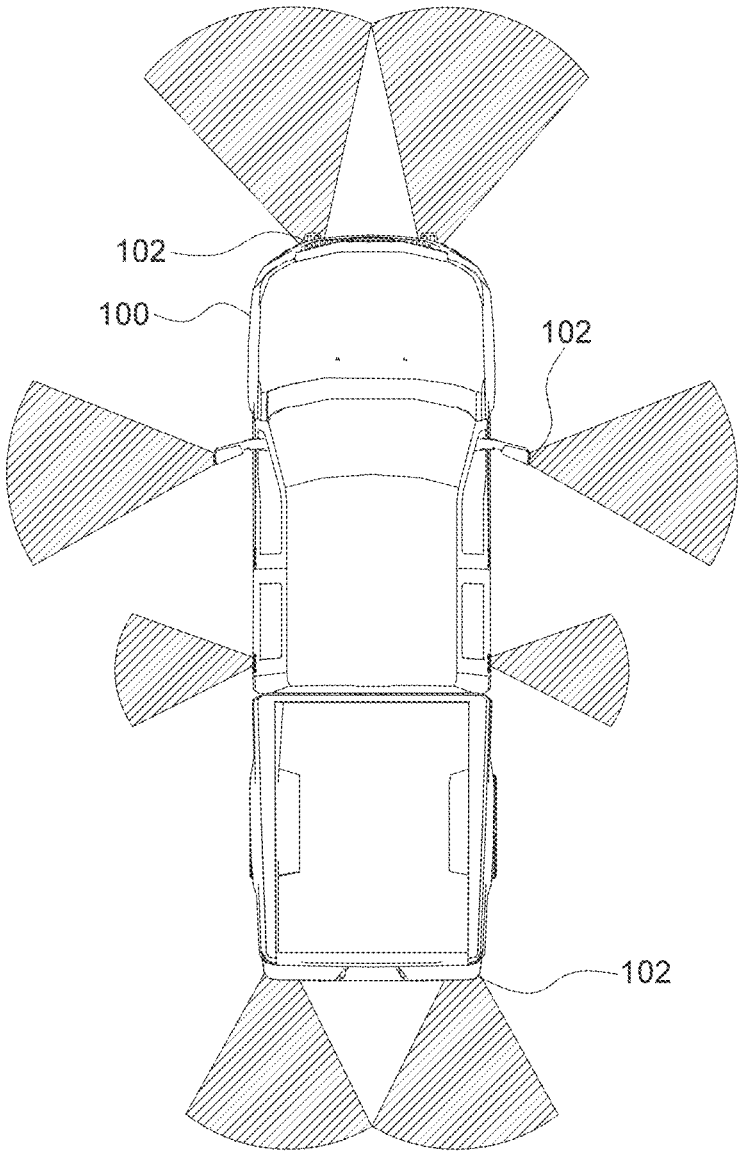
FIG. 1 depicts an example vehicle with a plurality of vehicle exterior lights in accordance with the present disclosure.

The present disclosure describes a system and method for automatically controlling the operation of vehicle exterior lights to illuminate areas proximate to (or around) the vehicle. The vehicle exterior lights provide enhanced visibility around the vehicle, particularly useful in low-light or dark conditions. The system may determine situations or locations in which the vehicle exterior lights need to be activated to enhance the user experience.

In some aspects, the system may enable/activate vehicle's automatic zone feature mode when the vehicle speed may be less (e.g., less than a first predefined threshold value), and when the ambient light intensity may be low (e.g., less than a second predefined threshold value). For instance, the system may enable the automatic zone feature mode when the vehicle may be moving at a speed of less than 5 MPH in low-light or dark conditions. When the automatic zone feature mode is enabled, the system may automatically activate the vehicle exterior lights to illuminate areas/zones around the vehicle.

In some aspects, to efficiently illuminate the areas/zones around the vehicle, the system may monitor the vehicle user's action inside the vehicle. The system may activate the exterior lights when the user performs any action that indicates that the user intends to view a specific object (e.g., a mailbox) outside the vehicle. For instance, when the user slides down a vehicle window and attempts to reach out to the object (e.g., to view or access the object) from the open vehicle window, the system may automatically activate the exterior lights to enable the user to conveniently view/access the object. In some aspects, the system may select or identify one or more optimal exterior lights to properly illuminate the object. For instance, when the object is located in proximity to the driver's sitting area, the system may activate the exterior light that is located in proximity to the driver's sitting area to efficiently illuminate the object.

In further aspects, the system may activate the optimal exterior light when a particular object is detected in proximity to the vehicle. In some aspects, the system may track a pattern of the user accessing the particular object over time, and store information associated with this pattern in a vehicle memory. When the automatic zone feature mode is enabled, the system may fetch the information associated with the stored pattern from the vehicle memory, and automatically activate the optimal exterior light whenever the vehicle approaches the particular object.

In further aspects, the system may activate the optimal exterior light based on audio inputs from the user, which may indicate that the user intends to view or access the object. In some aspects, the audio input may include a description of the specific object (e.g., "look for the blue house with green shutters and a white picket fence") that the user intends to view or access. Responsive to obtaining such an audio input, the system may obtain images of the vehicle's surrounding area from the vehicle camera, and then perform image processing/recognition on the images to identify the specific object in the images. When the system identifies the specific object in the images, the system may activate the optimal exterior light to illuminate the specific object.

The present disclosure discloses a vehicle that automatically activates or deactivates the vehicle's exterior lights, without user interaction with a vehicle Human-Machine Interface (HMI), to enhance the user experience of operating the vehicle. In addition, the vehicle enables the vehicle user (vehicle driver and/or passengers) to view/access specific objects that they are looking for. The vehicle automatically turns on zone lighting feature to help drivers keep their eyes on where they need to be looking to drive and prevent any adverse situation.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example vehicle 100 with a plurality of vehicle exterior lights 102 (or a plurality of lighting units, hereinafter referred to as "vehicle exterior lights 102") in accordance with the present disclosure. The vehicle 100 may take the form of any passenger or commercial vehicle such as a car, a work vehicle, a crossover vehicle, a van, a minivan, etc. Further, the vehicle 100 may be a manually driven vehicle and/or may be configured to operate in a fully autonomous (e.g., driverless) mode or a partially autonomous mode and may include any powertrain such as a gasoline engine, one or more electrically-actuated motor(s), a hybrid system, etc.

The vehicle exterior lights 102 may be oriented on an exterior of the vehicle 100 to illuminate areas proximate to (or around) the vehicle 100. The vehicle exterior lights 102 may be, for example, puddle lights, headlights, taillights or reverse lights, and/or the like. The puddle lights are in the side mirror area (or door panels), and may emit light pointing outwards. The vehicle exterior lights 102 may illuminate areas around the vehicle 100, such as the front, rear, or sides. The vehicle exterior lights 102 provide enhanced visibility around the vehicle 100, particularly useful in low-light or dark conditions. The vehicle exterior lights 102 emit different types of lights. For example, the headlight primarily emits white or selective yellow light for forward illumination, the taillights are designed to emit red light for rear visibility, and the puddle lights may emit white or amber light.

The vehicle 100 may further include a light control unit (shown as light control unit 212 in FIG. 2) that may manage operation of the vehicle exterior lights 102. For instance, the light control unit (or "unit") may automatically activate or deactivate the vehicle exterior lights 102. In some aspects, the unit may simultaneously activate or deactivate all the vehicle exterior lights 102. Alternatively, the unit may selectively activate or deactivate one or more vehicle exterior lights 102 to illuminate specific areas/zones around the vehicle 100. For instance, the unit may selectively activate the puddle lights to illuminate areas in the left side or the right side of the vehicle 100.

In some aspects, the vehicle exterior lights 102 may enable a vehicle user (shown as vehicle user 302 in FIG. 3) to view or access a specific object (shown as object 304 in FIG. 3) located in proximity to the vehicle 100, in low-light or dark conditions. The vehicle user may be a vehicle driver or any vehicle passenger. The specific object ("object") may be located outside the vehicle 100. The object may be, for example, a mailbox/drop-box, badge readers/parking payment systems, ATM machine, menu at "drive thru", street number boards, house number plate/board, license plate, a specific house, narrow driveway, or any other similar object/item.

The unit may control the operation of the vehicle exterior lights 102 to illuminate the object, thereby enabling the user view or access the object in low-light or dark conditions. For instance, the unit may automatically activate the vehicle exterior lights 102 to illuminate the object when the vehicle 100 may be located in proximity to the object. In some aspects, the unit may select an optimal exterior light (from the vehicle exterior lights 102) to efficiently illuminate the object. In an exemplary aspect, to select the optimal exterior light, the unit may identify a location of the object relative to the vehicle 100, and then select the optimal exterior light based on the location of the object. Responsive to selecting the optimal exterior light, the unit may activate the selected light to illuminate the object. For instance, when the object is located at a left side of the vehicle 100, the unit may activate the left side's puddle light to illuminate the object.

In some aspects, the unit may select and activate the optimal exterior light when a predefined condition is met. The predefined condition may be associated with a vehicle user's action in the vehicle 100 and/or a presence of the object in proximity to the vehicle 100. For instance, the predefined action may be met when the user performs an action that indicates that the user intends to view or access the object. As an example, the predefined action may be met when the user attempts to reach out from the vehicle 100 via an open vehicle window to access a mailbox, while sitting inside the vehicle 100. In further aspects, the predefined condition may be met when a real-time vehicle geolocation matches with a Global Positioning System (GPS) location of the object that may be tagged by the user/unit (i.e., when the object is located in proximity to the vehicle 100). As an example, in this case, the user may "tag" (via a GPS tag) the home mailbox and request the unit to illuminate the mailbox via the vehicle exterior lights 102 when the vehicle 100 is located in proximity to the mailbox. Based on the GPS tag, the unit may activate one or more vehicle exterior lights 102 to illuminate the mailbox when the vehicle 100 approaches or is in proximity to the mailbox. As another example, the unit may detect a pattern of illumination of the object, e.g., the home mailbox or any other mailbox, based on the user action described above. Based on the detected pattern (or "historical pattern"), the unit may automatically tag the object, and may activate one or more vehicle exterior lights 102 to illuminate the object when the vehicle 100 is in proximity to the object.

In some aspects, before activating the vehicle exterior lights 102 to illuminate the object, the unit may first obtain information associated with ambient light intensity from a vehicle's ambient light sensor. Responsive to obtaining the information associated with ambient light intensity, the unit may check whether the ambient light intensity is less than or greater than a predefined threshold value (or "first threshold value"). Stated another way, the unit may check whether it is dark outside or not. Responsive to detecting that the ambient light intensity is less than the predefined threshold value (i.e., it is dark outside), the unit may perform the step of determining whether the predefined condition is met or not (and then activate one or more vehicle exterior lights 102 when the predefined condition is met). In this manner, the unit may activate the vehicle exterior lights 102 to illuminate the object when the vehicle 100 is moving/located in low-light or dark conditions, and may not activate the vehicle exterior lights 102 when the vehicle 100 may be moving/located during day time.

In addition to checking the ambient light intensity, the unit may check the vehicle speed by obtaining inputs from a vehicle control unit. In an exemplary aspect, the unit may perform the step of determining whether the predefined condition is met or not (and hence perform the step of activating the vehicle exterior lights 102) when the vehicle speed is less than a predefined threshold value (or "second threshold value"). For instance, the unit may activate the vehicle exterior lights 102 when the vehicle 100 may be moving at a speed of less than 5 MPH. On the other hand, the unit may not activate the vehicle exterior lights 102 when the vehicle 100 is moving at speed of greater than 5 MPH.

Further vehicle details are described below in conjunction with FIG. 2.

The vehicle 100 and/or the user implement and/or perform operations, as described here in the present disclosure, in accordance with the owner manual and safety guidelines. In addition, any action taken by the user based on notifications provided by the vehicle 100 should comply with all the rules specific to the location and operation of the vehicle 100 (e.g., Federal, state, country, city, etc.). The notifications, as provided by the vehicle 100, should be treated as suggestions and only followed according to any rules specific to the location and operation of the vehicle 100.

Figure 2:
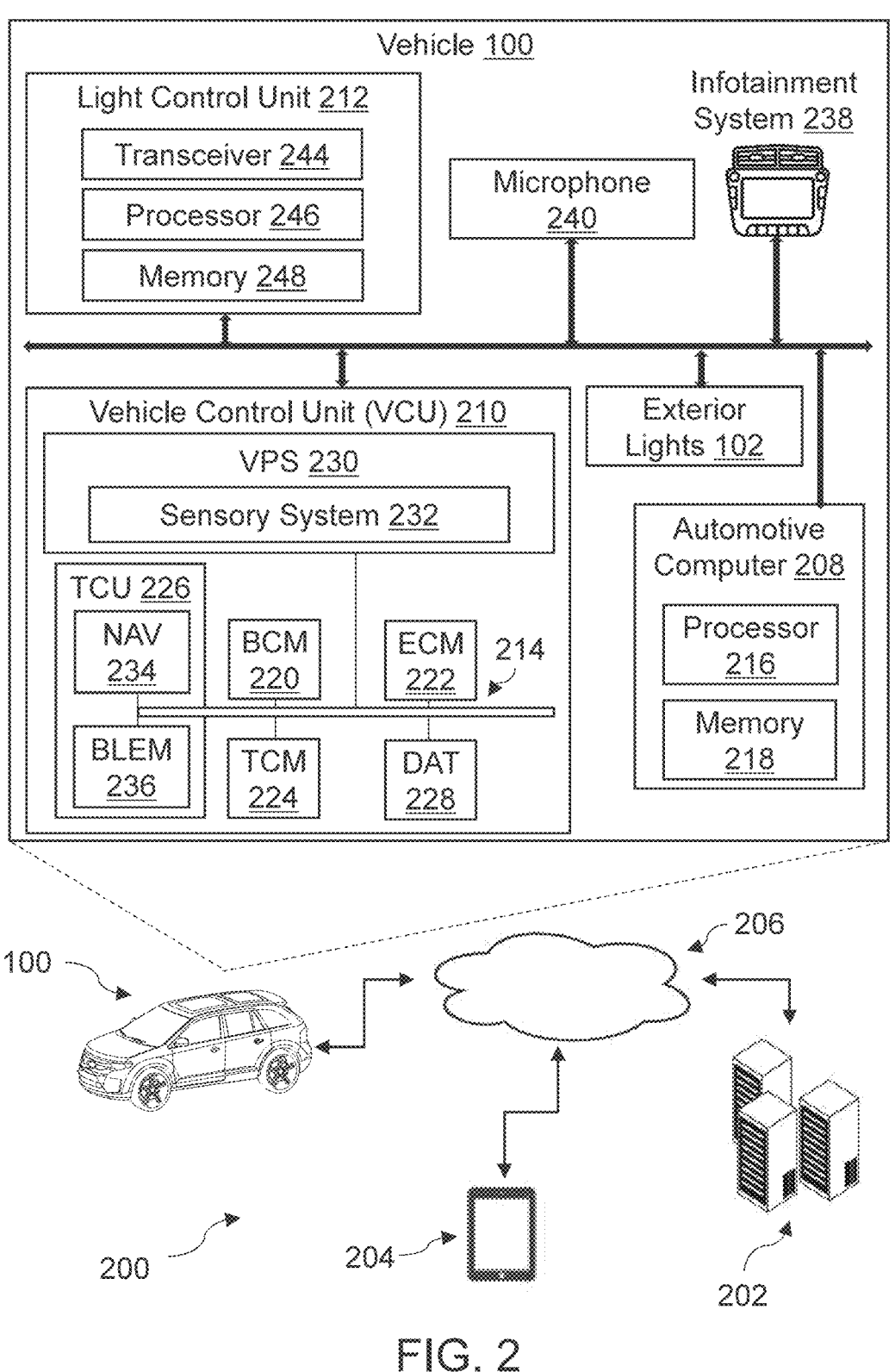
FIG. 2 depicts a block diagram of a system to control an operation of vehicle exterior lights in accordance with the present disclosure.

FIG. 2 depicts a block diagram of a system 200 to control the operation of the vehicle exterior lights 102 in accordance with the present disclosure. While describing FIG. 2, references will be made to FIGS. 3, 4 and 5.

The system 200 may include the vehicle 100, one or more servers 202 (or a server 202), a user device 204 communicatively coupled with each other via one or more networks 206. The server 202 may be part of a cloud-based computing infrastructure and may be associated with and/or include a Telematics Service Delivery Network (SDN) that provides digital data services to the vehicle 100 and other vehicles (not shown in FIG. 2) that may be part of a vehicle fleet. In further aspects, the server 202 may provide Artificial Intelligence (AI)/Machine Learning (ML) based image processing/recognition algorithms to the vehicle 100, which may enable the vehicle 100 to analyze images captured by one or more vehicle interior and/or exterior cameras and perform one or more actions based on the image analysis. For example, the vehicle 100 may determine a presence of a specific object in proximity to the vehicle 100, and/or the like based on the image analysis. The server 202 may provide the AI/ML based image processing/recognition algorithms to the vehicle 100 at a predefined frequency, or when the vehicle 100 transmits a request to the server 202 to obtain such algorithms.

The user device 204 may be associated with the vehicle user, and may be, for example, a mobile phone, a computer, a laptop, a tablet, a smart wearable device, or any other device with communication capabilities.

The network(s) 206 illustrates an example communication infrastructure in which the connected devices discussed in various embodiments of this disclosure may communicate. The network(s) 206 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 100 may include a plurality of units including, but not limited to, an automotive computer 208, a Vehicle Control Unit (VCU) 210, and a light control unit 212 (or unit 212). The VCU 210 may include a plurality of Electronic Control Units (ECUs) 214 in communication with the automotive computer 208.

In some aspects, the automotive computer 208 and/or the unit 212 may be installed anywhere in the vehicle 100, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be in communication with one or more memory devices in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable medium or memory storing a light control program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle 100 systems, connected servers (e.g., the server(s) 202), and other vehicles (not shown in FIG. 2) operating as part of a vehicle fleet. The VCU 210 may include or communicate with any combination of the ECUs 214, such as a Body Control Module (BCM) 220, an Engine Control Module (ECM) 222, a Transmission Control Module (TCM) 224, a telematics control unit (TCU) 226, a Driver Assistances Technologies (DAT) controller 228, etc.

The VCU 210 may further include and/or communicate with a Vehicle Perception System (VPS) 230, having connectivity with and/or control of one or more vehicle sensory system(s) 232 (or a "vehicle sensor suite"). The vehicle sensory system 232 may include one or more vehicle sensors including, but not limited to, a Radio Detection and Ranging (radar) sensor configured for detection and localization of objects inside and outside the vehicle 100 using radio waves, sitting area buckle sensors, sitting area sensors, a Light Detecting and Ranging (lidar) sensor, door sensors, proximity sensors, temperature sensors, wheel sensors, ambient weather sensors, ambient light sensors (that may detect ambient light intensity), vehicle internal and external cameras, infrared sensors, one or more rain sensors, capacitive moisture sensors, etc.

In some aspects, the vehicle sensory system 232 may capture images of a vehicle interior portion and a vehicle exterior portion, via, e.g., vehicle internal and external cameras, infrared sensors (or IR sensors), and/or the like.

In some aspects, the VCU 210 may control vehicle operational aspects and implement one or more instruction sets received from the user device 204, from one or more instruction sets stored in the memory 218, including instructions operational as part of the unit 212.

The TCU 226 may be configured and/or programmed to provide vehicle connectivity to wireless computing systems onboard and off board the vehicle 100 and may include a Navigation (NAV) receiver 234 for receiving and processing a GPS signal, a BLE Module (BLEM) 236, a Wi-Fi transceiver, a UWB transceiver, and/or other wireless transceivers (not shown in FIG. 2) that may be configurable for wireless communication (including cellular communication) between the vehicle 100 and other systems (e.g., a vehicle key fob, not shown in FIG. 2), computers, and modules. The TCU 226 may be in communication with the ECUs 214 by way of a bus.

The ECUs 214 may control aspects of vehicle operation and communication using inputs from human drivers, inputs from an autonomous vehicle controller, the unit 212, and/or via wireless signal inputs received via the wireless connection(s) from other connected devices, such as the user device 204, the server(s) 202, among others.

The BCM 220 generally includes integration of sensors, vehicle performance indicators, and variable reactors associated with vehicle systems and may include processor-based power distribution circuitry that can control functions associated with the vehicle body such as lights (including the vehicle exterior lights 102), windows, security, camera (s), audio system(s) (including microphone 240 described below), speakers, wipers, door locks and access control, and various comfort controls. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, adaptive cruise control, among other features. The DAT controller 228 may also provide aspects of user and environmental inputs usable for user authentication.

In some aspects, the automotive computer 208 may connect with an infotainment system 238 (or a vehicle Human-Machine Interface (HMI)). The infotainment system 238 may include a touchscreen interface portion and may include voice recognition features, biometric identification capabilities that can identify users based on facial recognition, voice recognition, fingerprint identification, or other biological identification means. The infotainment system 238 may further receive user instructions via the touchscreen interface portion, and/or display notifications, navigation maps, etc. on the touchscreen interface portion.

The vehicle 100 may further include one or more microphones 240 (or a microphone 240) and the vehicle exterior lights 102. The microphone 240 may receive audio inputs from the user (including the vehicle driver and passengers).

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered limiting or exclusive.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 100, may include a transceiver 244, a processor 246, and a computer-readable memory 248.

The transceiver 244 may receive information/inputs from one or more external devices or systems, e.g., the user device 204, the server(s) 202, and/or the like via the network 206. For example, the transceiver 244 may receive the AI/ML based image processing/recognition algorithms from the server(s) 202 via the network 206. Further, the transceiver 244 may transmit notifications (e.g., alert/alarm signals) to the external devices or systems. In addition, the transceiver 244 may receive information/inputs from vehicle 100 components such as the infotainment system 238, the vehicle sensory system 232, the microphone 240, and/or the like.

Further, the transceiver 244 may transmit notifications (e.g., alert/alarm/command signals) to the vehicle 100 components such as the infotainment system 238, the BCM 220, the vehicle exterior lights 102, etc.

The processor 246 and the memory 248 may be the same as or similar to the processor 216 and the memory 218, respectively. In some aspects, the processor 246 may be an AI/ML based processor that may utilize the memory 248 to store programs in code and/or to store data for performing aspects in accordance with the disclosure. The memory 248 may be a non-transitory computer-readable medium or memory storing the light control code. In some aspects, the memory 248 may additionally store the AI/ML based image processing/recognition algorithms that the vehicle 100 may obtain from the server(s) 202.

In operation, when the vehicle 100 is moving, the processor 246 may obtain inputs from the vehicle sensory system 232 (e.g., the ambient light sensor). The inputs may include information associated with the ambient light intensity. Responsive to obtaining the information associated with the ambient light intensity, the processor 246 may compare the ambient light intensity with a predefined threshold (e.g., a "first predefined threshold value"). Based on the comparison, the processor 246 may detect/identify that the ambient light intensity may be less than the first predefined threshold value. Stated another way, based on the comparison, the processor 246 may detect that the vehicle 100 is moving in low-light or dark conditions. Responsive to such detection, the processor 246 may enable or activate vehicle's automatic zone feature mode. When the automatic zone feature mode is enabled, the processor 246 may automatically activate or deactivate the vehicle exterior lights 102 or control the operation of these lights, to illuminate areas/ zones around the vehicle 100.

In addition, the processor 246 may obtain information associated with the vehicle speed from the VCU 210. Responsive to obtaining the information associated with the vehicle speed, the processor 246 may compare the vehicle speed with another predefined threshold (e.g., a "second predefined threshold value"). Based on the comparison, the processor 246 may detect/identify that the vehicle speed may be less than the second predefined threshold value. Stated another way, based on the comparison, the processor 246 may identify that the vehicle 100 may be moving slowly. Responsive to such detection, the processor 246 may enable the automatic zone feature mode. For instance, the processor 246 may enable the automatic zone feature mode when the vehicle 100 is moving at speed less than 5 MPH.

It may be appreciated from the description above that the processor 246 enables the vehicle's automatic zone feature mode when the ambient light intensity is less than the first predefined threshold value and the vehicle speed is less than the second predefined threshold value. Stated another way, the processor 246 may enable the automatic zone feature mode when the vehicle 100 is moving slowly in low-light or dark conditions.

When the automatic zone feature mode is enabled, the processor 246 may identify whether a predefined condition is met or not. The processor 246 may activate one or more vehicle exterior lights 102 when the predefined condition is met. On the other hand, when the predefined condition is not met, the processor 246 may keep the vehicle exterior lights 102 deactivated. In some aspects, the predefined condition may be associated with a vehicle user action (associated with a vehicle user 302 shown in FIGS. 3 and 4) or a presence of a specific object 304 (shown in FIGS. 3 and 4) in proximity to the vehicle 100, which is described below in detail.

Figure 3:
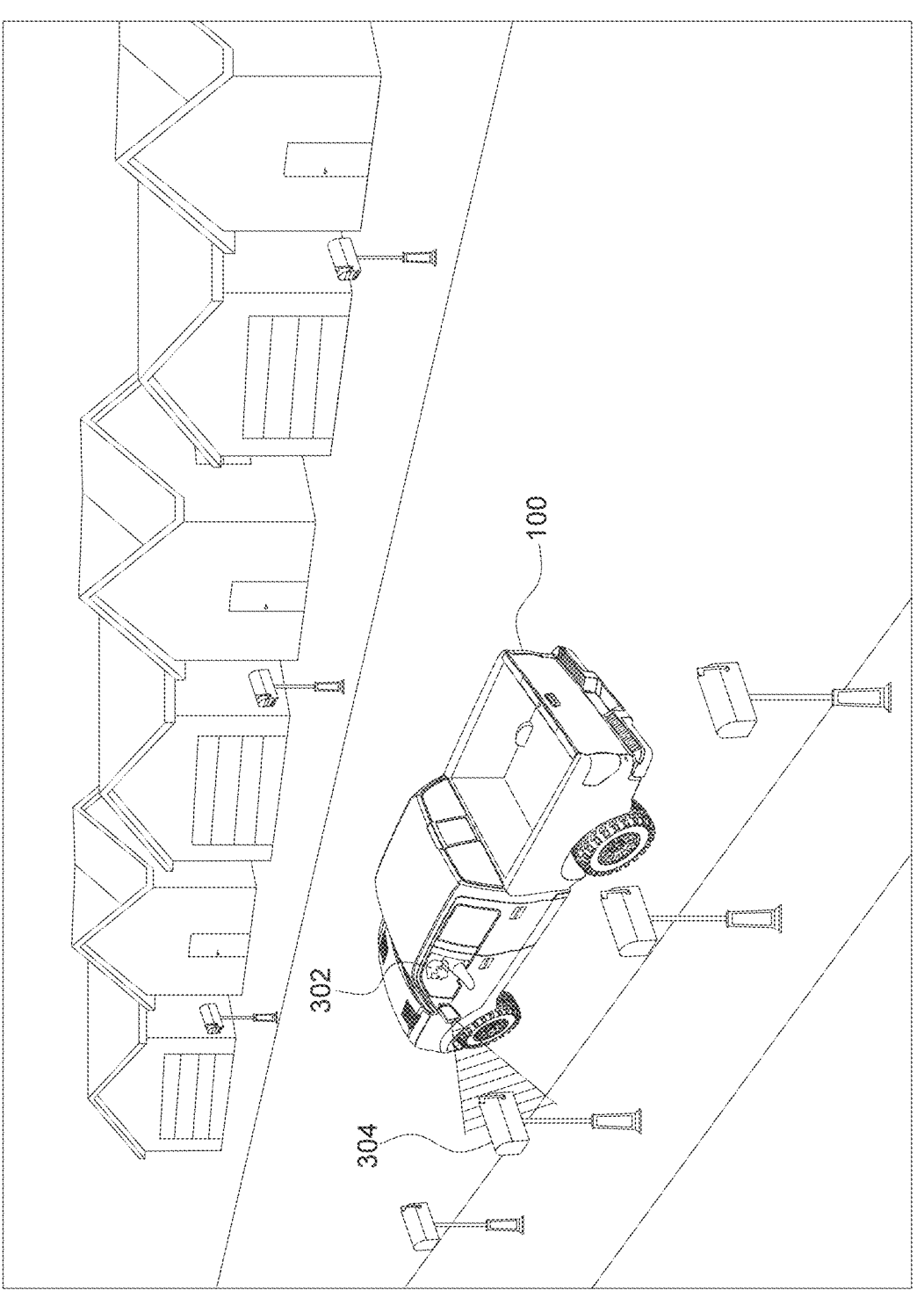
FIG. 3 depicts an example vehicle user action inside a vehicle when the vehicle is located in proximity to a specific object in accordance with the present disclosure.

In some aspects, the predefined condition may be met when the vehicle user 302 (or user 302) performs an action (or a "vehicle user action") that indicates that the user 302 intends to view the specific object 304 (or object 304). FIG. 3 depicts the object 304 as a mailbox; however, the present disclosure is not limiting to the aspect of the object 304 being a mailbox. The object 304 may be any other object/item without departing from the scope of the present disclosure, as described above in conjunction with FIG. 1.

As an example, the processor 246 may identify/detect that the predefined condition is met when the user 302 slides down a vehicle window and attempts to reach out from the vehicle 100 to view or access the object 304 via the open window.

In some aspects, to detect the user action described above, the processor 246 may obtain inputs (e.g., a "first input") from the vehicle sensory system 232 (e.g., the internal or external cameras), when the automatic zone feature mode is enabled. Based on the first input (that may include images captured by the vehicle cameras), the processor 246 may detect that the user 302 is attempting to reach out from the vehicle 100 via an open window to view or access the object 304. In this case, the processor 246 may identify that the predefined condition is met when the processor 246 detects that the user 302 is attempting to reach out from the open window to view or access the object 304. For instance, when the user 302 tilts or moves the user's body/arm towards the object 304 from the open window (as shown in FIG. 3), the processor 246 may identify that the predefined condition is met. In some aspects, the processor 246 may perform image processing on the images obtained from the vehicle sensory system 232 by using the image processing/recognition algorithms (described in detail later below in conjunction with FIG. 5) to determine whether the predefined condition is met or not.

In another example, the processor 246 may use the inputs (or a "second input", which also include images captured from the vehicle cameras) obtained from the vehicle sensory system 232 to detect/check the user's gesture. For example, based on the second input, the processor 246 may detect a user gesture that indicates that the user 302 intends to view or access the object 304. Responsive to such detection, the processor 246 may identify that the predefined condition is met. For instance, when the user 302 points towards the object 304 (with the vehicle windows closed), the processor 246 may determine that the user 302 intends to view or access the object 304, and hence identify that the predefined condition is met.

Responsive to identifying that the predefined condition is met, the processor 246 may select or identify one or more optimal exterior lights, from the vehicle exterior lights 102, to properly illuminate the object 304. The processor 246 may then automatically activate or turn-on the optimal exterior light, thereby enabling the user 302 to conveniently view and access the object 304. In some aspects, the processor 246 may determine/identify a location of the open window from where the user 302 is attempting to reach out to the object 304 to identify the optimal exterior light. The processor 246 may use the inputs obtained from the vehicle sensory system 232 (e.g., images captured by the vehicle's interior cameras or window sensors) to identify the location of the open window. The processor 246 may identify the optimal exterior light to illuminate the object 304 based on the location of the open vehicle window. For example, the processor identify the left side exterior light (e.g., left side puddle light) as the optimal exterior light to illuminate the object 304 when the driver's window is open.

In further aspects, instead of identifying the location of the open window, the processor 246 may identify a location of the object 304 relative to the vehicle 100 to identify the optimal exterior light. For instance, the processor 246 may activate the puddle light located near the driver's sitting area when the mailbox is located in proximity to the driver's sitting area.

The processor 246 may maintain the optimal exterior light in an activated mode/state until the vehicle 100 passes the object 304 (or until the vehicle 100 (e.g., first, second, or third sitting row of the vehicle 100) is aligned with the object 304). Further, the processor 246 may deactivate the optimal exterior light when the vehicle 100 passes the object 304. In further aspects, the processor 246 may deactivate the optimal exterior light when the vehicle speed becomes greater than the second predefined threshold value. Stated another way, the processor 246 may deactivate the optimal exterior light when the vehicle speed is increased by the driver (indicating that the driver does not intend to view or access the object 304).

In addition or alternative to checking whether the predefined condition is met or not based on the user action, the processor 246 may perform this check based on other parameters/inputs, as described below.

Figure 4:
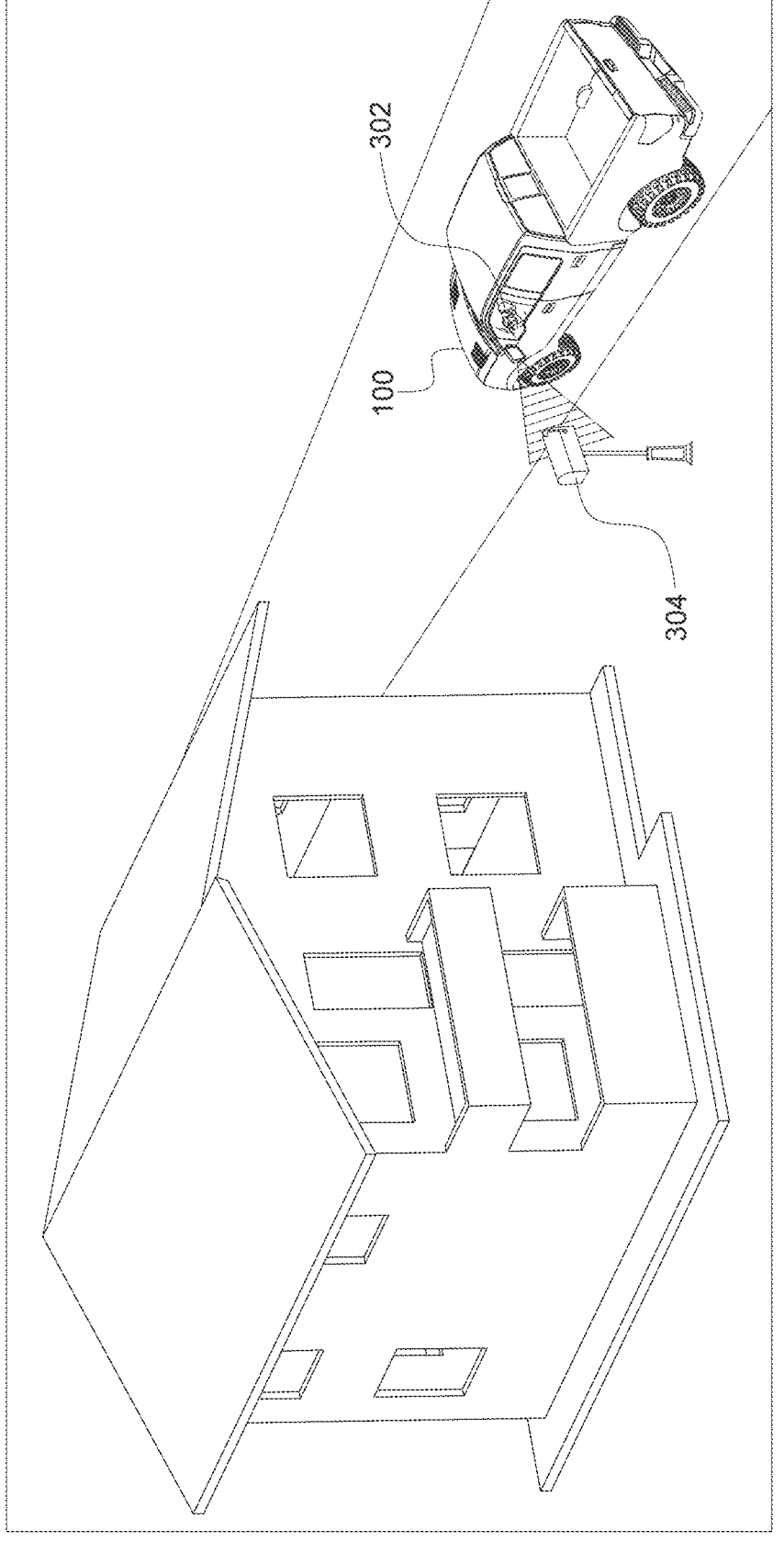
FIG. 4 depicts an example view of a vehicle moving in proximity to a specific object in accordance with the present disclosure.

In some aspects (as described above), the predefined condition may be associated with the presence of the object 304 in proximity to the vehicle 100. In some aspects, the processor 246 may obtain a GPS location (or a GPS tag) associated with the object 304 from the user 302. The processor 246 may further determine a real-time vehicle geolocation from the VCU 210. Responsive to obtaining the GPS location and the real-time vehicle geolocation, the processor 246 may correlate/compare the GPS location and the real-time vehicle geolocation, and determine whether the object 304 is located in proximity to the vehicle 100 based on the comparison. Specifically, the processor 246 may determine that the object 304 is located in proximity to the vehicle 100 when the real-time vehicle geolocation matches with the "tagged" GPS location of the object 304. The processor 246 may identify that the predefined condition is met and may activate the optimal exterior light to illuminate the object/home mailbox (as shown in FIG. 4) when the object 304 is located in proximity to the vehicle 100. In this case, the processor 246 may identify the optimal exterior light to activate based on the location of the object 304 relative to the vehicle 100, as described above.

As an example of the aspect described above, the vehicle user 302 may provide the GPS location of the home mailbox to the processor 246 (via the transceiver 244) beforehand, and instruct/program the processor 246 to illuminate the home mailbox via the vehicle exterior lights 102 whenever the home mailbox is in proximity to the vehicle 100. Based on such request/instruction, the processor 246 may track the location of the vehicle 100 relative to the home mailbox (when the automatic zone feature mode is enabled) and illuminate the home mailbox via the optimal exterior light when the home mailbox is in proximity to the vehicle 100. It may be appreciated that in this case, the processor 246 may activate the exterior light to illuminate the home mailbox even if the vehicle window is closed and/or the user 302 is not attempting to view/access the home mailbox or pointing towards it.

In further aspects, the processor 246 may illuminate the object 304 based on the "context" associated with the object

304. For instance, the processor 246 may determine if the object 304 needs to be accessed more than once per day or not (as the "context"), and accordingly illuminate the object 304. For example, in this case, if the processor 246 determines that the mailbox is typically access once a day, the processor 246 may illuminate the mailbox via the exterior light when the vehicle 100 passes through the mailbox the first time, but may not illuminate when the vehicle 100 passes through the mailbox the second time in the same day. In some aspects, the processor 246 may determine the context described above by using a historical pattern of the vehicle 100/user 302 accessing the object 304 (information of historical pattern may be stored in the memory 248). In this case, the processor 246 may track the pattern of the user 302 accessing the object 304 over time, and may store information associated with the detected pattern in the memory 248, as described below.

In some aspects, the processor 246 may track a pattern of the user 302 accessing the object 304 and/or causing to illuminate the object 304 via the vehicle exterior lights 102 (e.g., based on the user action), and store information associated with the tracked pattern in the memory 248 as "historical pattern". The processor 246 may fetch the information associated with this historical pattern from the memory 248 when the automatic zone feature mode is enabled, and automatically activate the optimal exterior light when the vehicle 100 approaches the object 304 based on the fetched pattern. For instance, the processor 246 may observe/track that the user 302 typically slows down the vehicle 100 near the home mailbox (or any other mailbox) in the evening and reaches out to access/view the home mailbox. Based on such observation/tracking, the processor 246 may automatically activate the optimal exterior light when the home mailbox is in proximity to the vehicle 100, so that the user 302 can conveniently view/access the mailbox. In some aspects, the processor 246 may activate the optimal exterior light so that the user 302 may easily view the mailbox number and access the mailbox interior portion when the user 302 opens the mailbox.

In some aspects, the information associated with the historical pattern described above may include information associated with a historical frequency of illumination of the optimal exterior light in proximity to the object 304 in a day. For instance, the historical pattern may indicate that the user 302 generally accesses the home mailbox once a day in the evening (e.g., between 7 pm and 8 pm). Based on such pattern, the processor 246 may illuminate the home mailbox via the optimal exterior light when the vehicle 100 is in proximity to the mailbox between 7-8 pm. In further aspects, the historical pattern may include information associated with a vehicle orientation while activating the optimal lighting unit in proximity to the object 304. For instance, the processor 246 may observe/track that the user 302 generally accesses the home mailbox while returning from the office. Based on such pattern, the processor 246 may illuminate the home mailbox when the vehicle 100 is heading towards the home.

In further aspects, when the automatic zone feature mode is enabled, the processor 246 may obtain audio input (or a "first audio input") from the microphone 240, which may be the user's voice command. The first audio input may indicate that the user 302 intends to view or access the object 304. For instance, the processor 246 may receive the first audio input stating, "Please illuminate the puddle light at the vehicle left side." Responsive to obtaining this audio input, the processor 246 may determine that the vehicle user 302 intends to view or access the object 304 based on the obtained audio input. Based on a determination that the user 302 intends to view or access the object 304, the processor 246 may identify that the predefined condition is met and then activate the optimal exterior light to illuminate the object 304, as described above.

In further aspects, when the automatic zone feature mode is enabled, the processor 246 may obtain a second audio input from the microphone 240, which may also be the user's voice command. The second audio input may include a description of the specific object that the user 302 intends to view or access. For instance, the second audio input may include a voice command such as "Look for the blue house with green shutters and a white picket fence" or "Look for the yellow side by side with the American flag on the back". As another example, the second audio input may include voice command such as "look for street name ABC", "house number 123", "license plate number A123", and/or the like.

Responsive to obtaining the second audio input from the microphone 240, the processor 246 may obtain inputs (or a "third input") from the vehicle sensory system 232 (e.g., vehicle cameras) to view the images of the vehicle's surrounding area. Responsive to obtaining the third input (that includes the images of the vehicle's surrounding area), the processor 246 may perform image processing and image recognition on the obtained images (by using the image processing/recognition algorithm obtained from the server 202). Based on the image processing and image recognition, the processor 246 may identify the specific object in the images that are referred to in the second audio input (or identify the presence of the specific object in the vehicle's surrounding area). The processor 246 may identify that the predefined condition is met when the specific object is present in the images of the vehicle's surrounding area, and then illuminate the specific object via the optimal external light when the predefined condition is met (as described above).

As described above, the processor 246 may utilize the AI/ML based image processing/recognition algorithms obtained from the server 202 to perform the step of image processing/recognition. The process of image processing/recognition is briefly described below in conjunction with FIG. 5.

Figure 5:
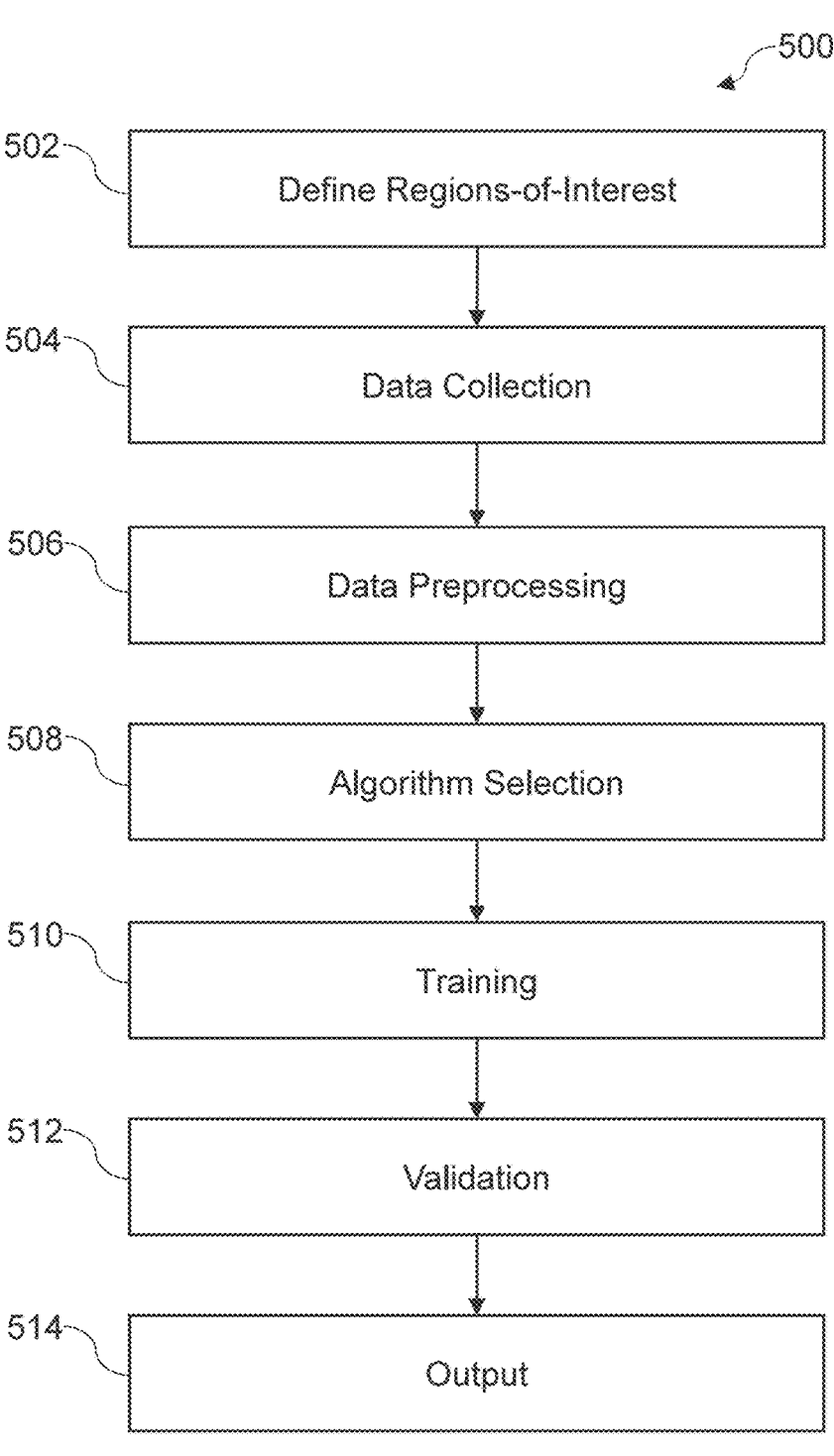
FIG. 5 depicts an example process for performing image processing and image recognition in accordance with the present disclosure.

FIG. 5 depicts an example process 500 for performing image processing and image recognition in accordance with the present disclosure. A step 502, of the process 500, includes defining a Region-Of-Interest (ROI), to set up initial scans and environment settings. Defining the ROI in image processing involves selecting a specific area within an image for focused analysis or processing. This allows algorithms to concentrate computational resources on relevant parts of the image, enhancing efficiency and accuracy. The ROI aids an AI image processing/recognition model to identify the specific objects in the images captured by the vehicle cameras. The ROI may include objects/items like mailboxes, ATMs, drive-thru environments, windows up/down, a person attempting to reach outside of an open vehicle window, etc.

A step 504, of the process 500, includes collecting dataset environments, scenarios, items of interest, and/or the like. The dataset may be stored for AI model usage, and may be modified via feedback. A step 506, of the process 500, includes performing data preprocessing. During the data preprocessing stage, the processor 246 (or any other processor) may process the captured images from the vehicle cameras and apply known image processing techniques such as filtering, ROI determination and bounding boxes highlighting/accenting them. A step 508, of the process 500, includes selecting algorithm/model to perform the image processing/recognition. In some aspects, the processor 246 may utilize a decision-tree regression model, which allows prediction of a continuous output variable (Good/Bad conditional check for entities) using a number of branching decisions where each branching decision may be represented by objects/entities/environments that are being checked or monitored for status.

A step 510, of the process 500, includes training the AI model. The training data for the AI model may include a multitude of input features (variables and attributes from typical/common environmental entities, scenarios, windows up/down, tinting, addresses and locations, etc.) and corresponding output labels (open/closed/correct/incorrect/etc.). During the training, the AI model may be constantly analyzing the patterns in the photos/images and the video feeds and making updates to its parameters accordingly. A step 512, of the process 500, includes validation/evaluation of the AI model. Once trained, the AI model may undergo generalization where the AI model may be evaluated on a separate dataset for validation. This may be used to assess the AI model's performance on new and unseen data representing all variations of input data. A step 514, of the process 500, includes providing output. Once training, evaluation and generalization stages are complete, the AI model may be used to make predictions and decisions for itself on new unseen environments and data. In this manner, the AI model may enable identification of the specific objects in the images captured by the vehicle cameras.

In accordance with the present disclosure, the processor 246 not only illuminates a specific object, but may also illuminate a driveway, a portion of a building, and/or the like, which may enable the user 302 to locate the driveway/building, and to conveniently drive through a narrow zone. In this case, as an example, the processor 246 may obtain GPS location associated with the driveway/building, and correlate it with the real-time vehicle geolocation. The processor 246 may activate the optimal exterior light to illuminate the driveway/building when the processor 246 determines that the vehicle 100 is in proximity to the driveway/building.

In addition to the aspects described above, the processor 246 may enable the automatic zone feature mode (and hence perform the actions described above) based on the driver's identity. Specifically, the processor 246 may enable this feature and perform the actions described above (i.e., activate the vehicle exterior lights 102 to illuminate the object 304) for specific driver(s) and may not enable it for others (e.g., based on the settings set by the driver(s)). In this case, the processor 246 may first obtain identity information associated with the vehicle user (e.g., the vehicle driver). The processor 246 may then verify the identity information against stored driver identity data, and enable the automatic zone feature mode based on the verification. Stated another way, the processor 246 may enable the automatic zone feature mode when the user's captured or obtained identify information matches with the stored driver identity data. The processor 246 may obtain or capture the user's identity information via facial recognition technology and/or via the user device 204 (used as Phone-as-a-key (PaaK)) and/or key fob).

Figure 6:
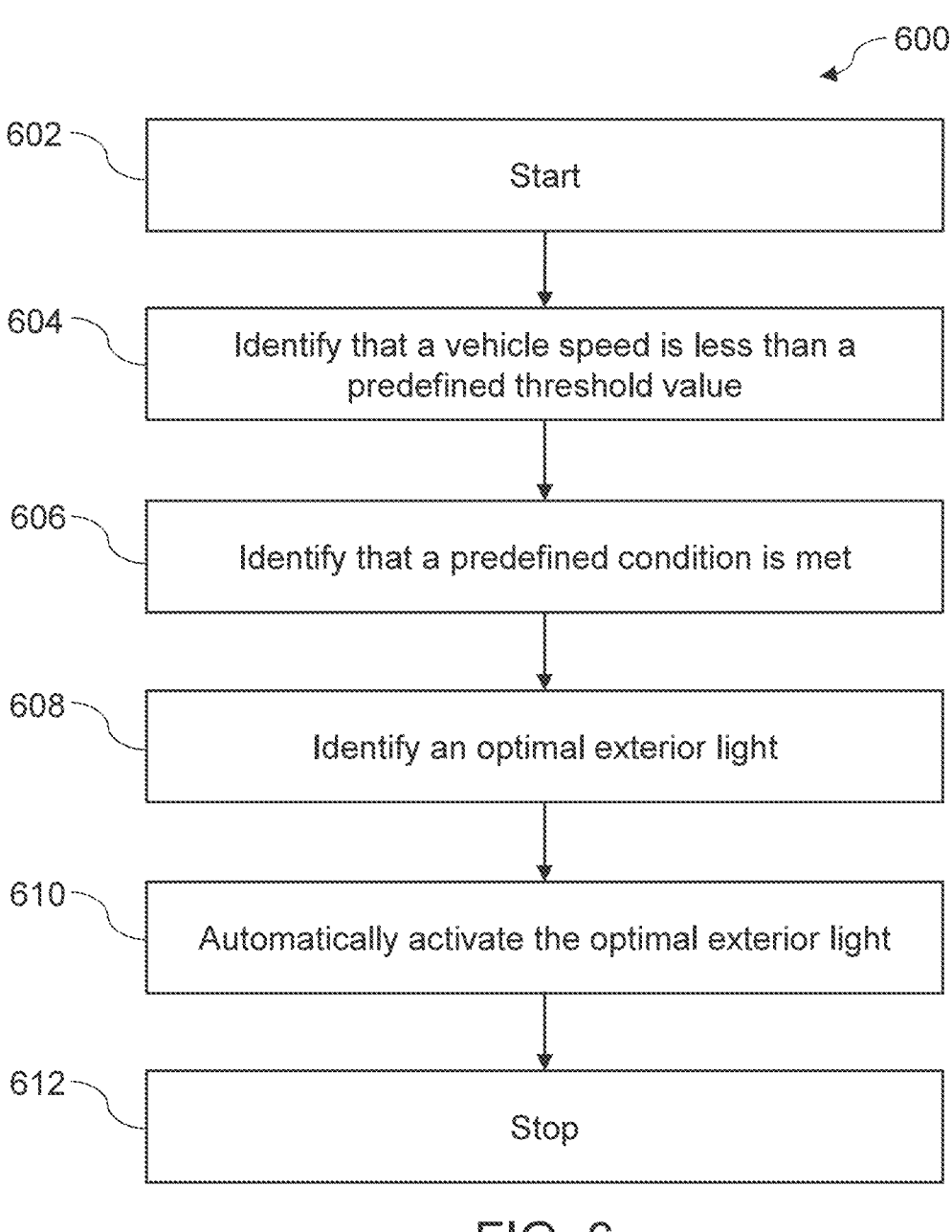
FIG. 6 depicts a flow diagram of a method for operating vehicle exterior lights in accordance with the present disclosure.

FIG. 6 depicts a flow diagram of a method 600 for operating vehicle exterior lights 102 in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include identifying, by the processor 246, that the vehicle speed is less than a predefined threshold value (e.g., the first predefined threshold value). At step 606, the method 600 may include identifying, by the processor 246, that a predefined condition is met associated with a vehicle user action or a presence of the object 304 in proximity to the vehicle 100, when the vehicle speed is less than the first predefined threshold value.

At step 608, the method 600 may include identifying, by the processor 246, the optimal exterior light, from the vehicle exterior lights 102, to illuminate the object 304 responsive to identifying that the predefined condition is met. At step 610, the method 600 may include automatically activating, by the processor 246, the optimal exterior light.

At step 612, the method 600 stops.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
a plurality of lighting units oriented on an exterior of the vehicle to illuminate areas proximate to the vehicle; and
a processor configured to:
  identify that a vehicle speed is less than a first predefined threshold value;
  identify that a predefined condition is met associated with a vehicle user action or a presence of a specific object in proximity to the vehicle, when the vehicle speed is less than the first predefined threshold value;
  identify an optimal lighting unit, from the plurality of lighting units, to illuminate the specific object responsive to identifying that the predefined condition is met; and
  automatically activate the optimal lighting unit.

2. The vehicle of claim 1 further comprising a vehicle sensor suite configured to capture images of a vehicle interior portion and a vehicle exterior portion.

3. The vehicle of claim 2, wherein the processor is further configured to:
  obtain a first input from the vehicle sensor suite;
  detect that a vehicle user is attempting to reach out from the vehicle via an open vehicle window to view or access the specific object, based on the first input; and identify that the predefined condition is met when the vehicle user is attempting to reach out to view or access the specific object.

4. The vehicle of claim 3, wherein, to identify the optimal lighting unit, the processor is configured to:
  identify a location of the open vehicle window; and
  identify the optimal lighting unit to illuminate the specific object based on the location of the open vehicle window.

5. The vehicle of claim 2, wherein the processor is further configured to:
  obtain a second input from the vehicle sensor suite;
  identify a vehicle user gesture associated with a vehicle user based on the second input;
  determine that the vehicle user intends to view or access the specific object based on the vehicle user gesture; and
  identify that the predefined condition is met based on a determination that the vehicle user intends to view or access the specific object.

6. The vehicle of claim 2 further comprising a microphone configured to receive an audio input from a vehicle user.

7. The vehicle of claim 6, wherein the processor is further configured to:
  obtain a first audio input from the microphone;
  determine that the vehicle user intends to view or access the specific object based on the first audio input; and
  identify that the predefined condition is met based on a determination that the vehicle user intends to view or access the specific object.

8. The vehicle of claim 6, wherein the processor is further configured to:
  obtain a second audio input from the microphone, wherein the second audio input comprises a description of the specific object that the vehicle user intends to view or access;
  obtain a third input from the vehicle sensor suite responsive to obtaining the second audio input, wherein the third input comprises images of a vehicle surrounding area;
  perform image processing and image recognition on the third input to identify the specific object in the vehicle surrounding area;
  identify the presence of the specific object in the vehicle surrounding area based on the image processing and image recognition; and
  identify that the predefined condition is met based on the identification of the presence of the specific object in the vehicle surrounding area.

9. The vehicle of claim 1, wherein the processor is further configured to:
  obtain information associated with a Global Positioning System (GPS) location of the specific object;
  identify a real-time vehicle geolocation;
  determine that the specific object is in proximity to the vehicle when the real-time vehicle geolocation matches with the GPS location; and
  identify that the predefined condition is met when the specific object is in proximity to the vehicle.

10. The vehicle of claim 1, wherein, to identify the optimal lighting unit, the processor is configured to:
  identify a location of the specific object relative to the vehicle; and
  identify the optimal lighting unit based on the location of the specific object.

11. The vehicle of claim 1, wherein the processor is further configured to:

obtain information associated with a historical pattern to activate the optimal lighting unit in proximity to the specific object; and automatically activate the optimal lighting unit when the vehicle approaches the specific object, based on the historical pattern.

12. The vehicle of claim 11, wherein the information associated with the historical pattern comprises information associated with a historical frequency of illumination of the optimal lighting unit in proximity to the specific object in a day.

13. The vehicle of claim 11, wherein the information associated with the historical pattern comprises information associated with a vehicle orientation while activating the optimal lighting unit in proximity to the specific object.

14. The vehicle of claim 1 further comprising an ambient light sensor configured to detect an ambient light intensity, wherein the processor is further configured to:

obtain a fourth input from the ambient light sensor;

detect that the ambient light intensity is less than a second predefined threshold value based on the fourth input; and identify that the predefined condition is met responsive to detecting that the ambient light intensity is less than the second predefined threshold value.

15. The vehicle of claim 1, wherein the processor is further configured to maintain the optimal lighting unit in an activated mode until the vehicle passes the specific object.

16. The vehicle of claim 1, wherein the processor is further configured to deactivate the optimal lighting unit when the vehicle speed exceeds the first predefined threshold value.

17. The vehicle of claim 1, wherein the processor is further configured to:

obtain identity information associated with a vehicle user;

verify the identity information against stored driver identity data; and enable an automatic zone feature mode to identify that the predefined condition is met based on the verification.

18. The vehicle of claim 17, wherein the processor obtains the identity information via at least one of: a user facial recognition or a user device.

19. A method comprising:

identifying, by a processor, that a vehicle speed is less than a predefined threshold value;

identifying, by the processor, that a predefined condition is met associated with a vehicle user action or a presence of a specific object in proximity to a vehicle, when the vehicle speed is less than the predefined threshold value;

identifying, by the processor, an optimal lighting unit, from a plurality of lighting units, to illuminate the specific object responsive to identifying that the predefined condition is met, wherein the plurality of lighting units is oriented on an exterior of the vehicle to illuminate areas proximate to the vehicle; and automatically activating, by the processor, the optimal lighting unit.

20. A non-transitory computer-readable storage medium having instructions stored thereupon which, when executed by a processor, cause the processor to:

identify that a vehicle speed is less than a predefined threshold value;

identify that a predefined condition is met associated with a vehicle user action or a presence of a specific object in proximity to a vehicle, when the vehicle speed is less than the predefined threshold value;

identify an optimal lighting unit, from a plurality of lighting units, to illuminate the specific object responsive to identifying that the predefined condition is met, wherein the plurality of lighting units is oriented on an exterior of the vehicle to illuminate areas proximate to the vehicle; and automatically activate the optimal lighting unit.

\* \* \* \* \*